United States Patent [19]
Fukuda et al.

[11] Patent Number: 6,064,834
[45] Date of Patent: *May 16, 2000

[54] EXPOSURE AND VIEW FINDER ORIENTATION SWITCHING MECHANISM FOR A CAMERA

[75] Inventors: Hiroshi Fukuda, Tokyo; Shiro Hashimoto; Nobuhiro Aoki, both of Saitama, all of Japan

[73] Assignees: Fuji Photo Film Co., Ltd., Kanagawa; Fuji Photo Optical Co., Ltd., Saitama, both of Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/810,222

[22] Filed: Feb. 28, 1997

[30] Foreign Application Priority Data

| Mar. 1, 1996 | [JP] | Japan | 8-044690 |
| Mar. 26, 1996 | [JP] | Japan | 8-097639 |
| Sep. 18, 1996 | [JP] | Japan | 8-269436 |

[51] Int. Cl.$^7$ ............................ G03B 13/10; G03B 17/00
[52] U.S. Cl. ........................ 396/380; 396/435; 396/436
[58] Field of Search ................... 396/435, 436, 396/378, 380

[56] References Cited

U.S. PATENT DOCUMENTS

| 5,066,971 | 11/1991 | Kodaira | 396/380 |
| 5,493,356 | 2/1996 | Tokui | 396/435 |
| 5,539,489 | 7/1996 | Yamamoto | 396/437 |
| 5,550,606 | 8/1996 | Jansen, Jr. et al. | 396/436 |
| 5,583,591 | 12/1996 | Saito et al. | 396/429 |
| 5,587,755 | 12/1996 | Wilson | 396/380 |
| 5,592,252 | 1/1997 | Kobayashi et al. | 396/380 |
| 5,602,606 | 2/1997 | Yazawa | 396/435 |
| 5,652,932 | 7/1997 | Kobayashi et al. | 396/378 |
| 5,659,832 | 8/1997 | Nishizawa et al. | 396/435 |
| 5,678,081 | 10/1997 | Tanaka | 396/284 |
| 5,749,012 | 5/1998 | Kodaira | 396/435 |

*Primary Examiner*—Eddie C. Lee
*Attorney, Agent, or Firm*—Young & Thompson

[57] ABSTRACT

When a switching lever is positioned for horizontal photographing, an exposure frame composed of two switching frames is switched to a horizontal photographing exposure frame. When the switching lever is positioned for vertical photographing, a wheel ring starts rotating about a photographic optical axis, and the switching frames start moving by the operation of elongated holes. When the switching lever is positioned for vertical photographing, the exposure frame composed of two switching frames is switched to a vertical photographing exposure frame.

16 Claims, 17 Drawing Sheets

HORIZONTAL PHOTOGRAPHING

VERTICAL PHOTOGRAPHING

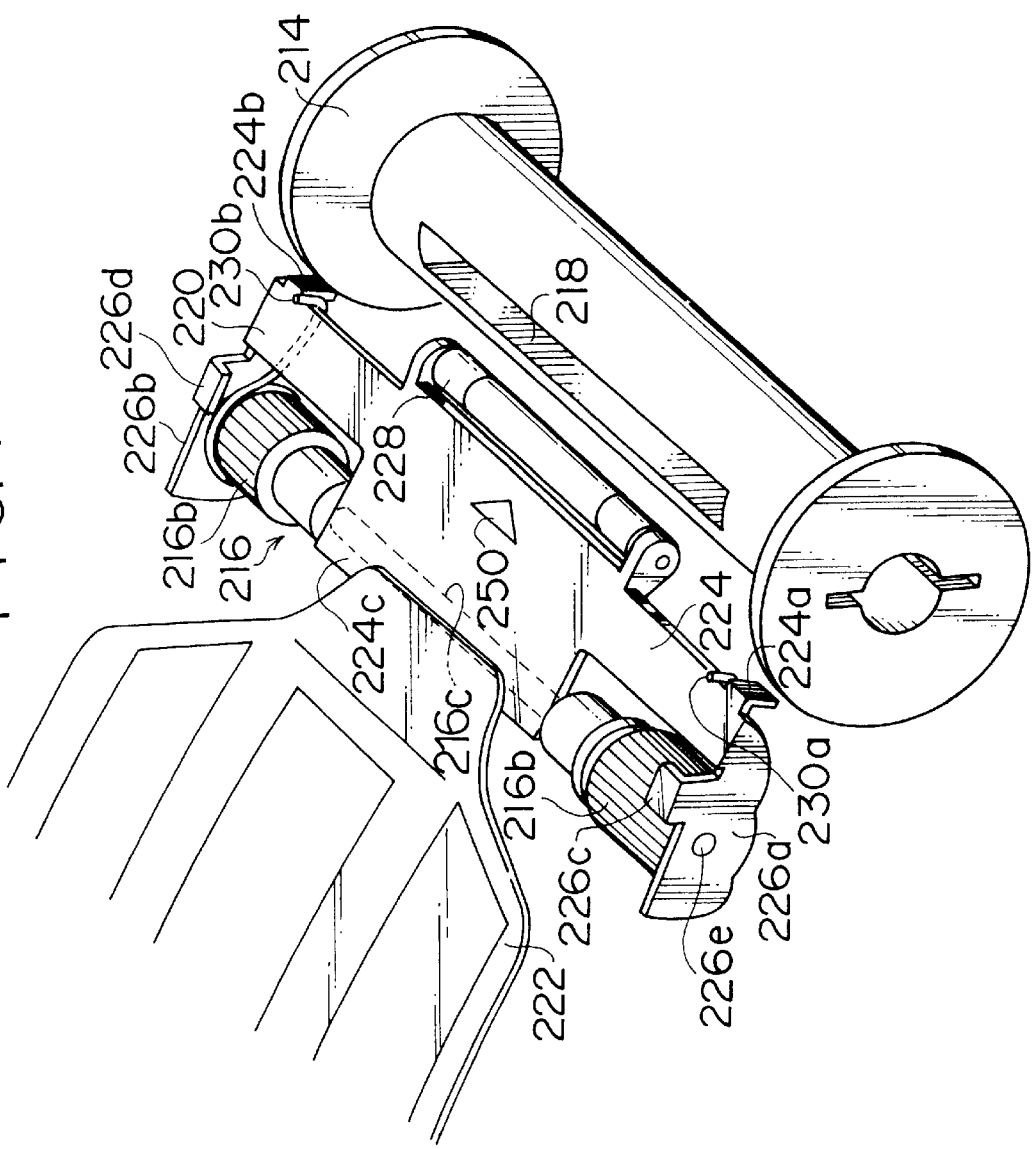

F I G. 2 0
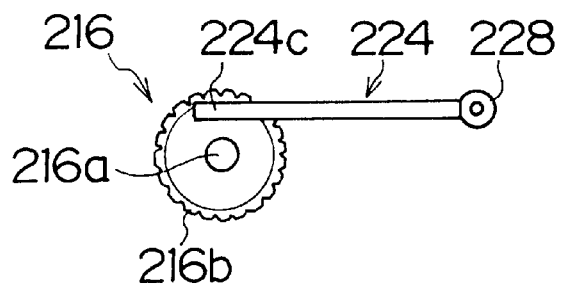
F I G. 2 1
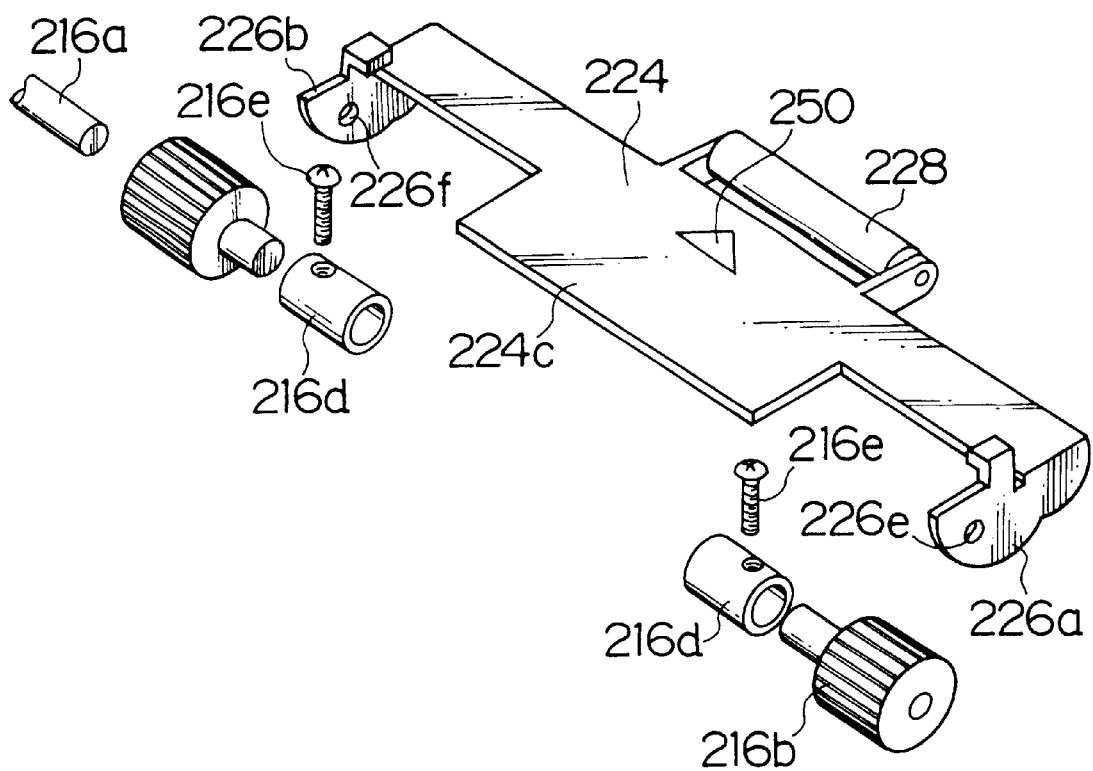

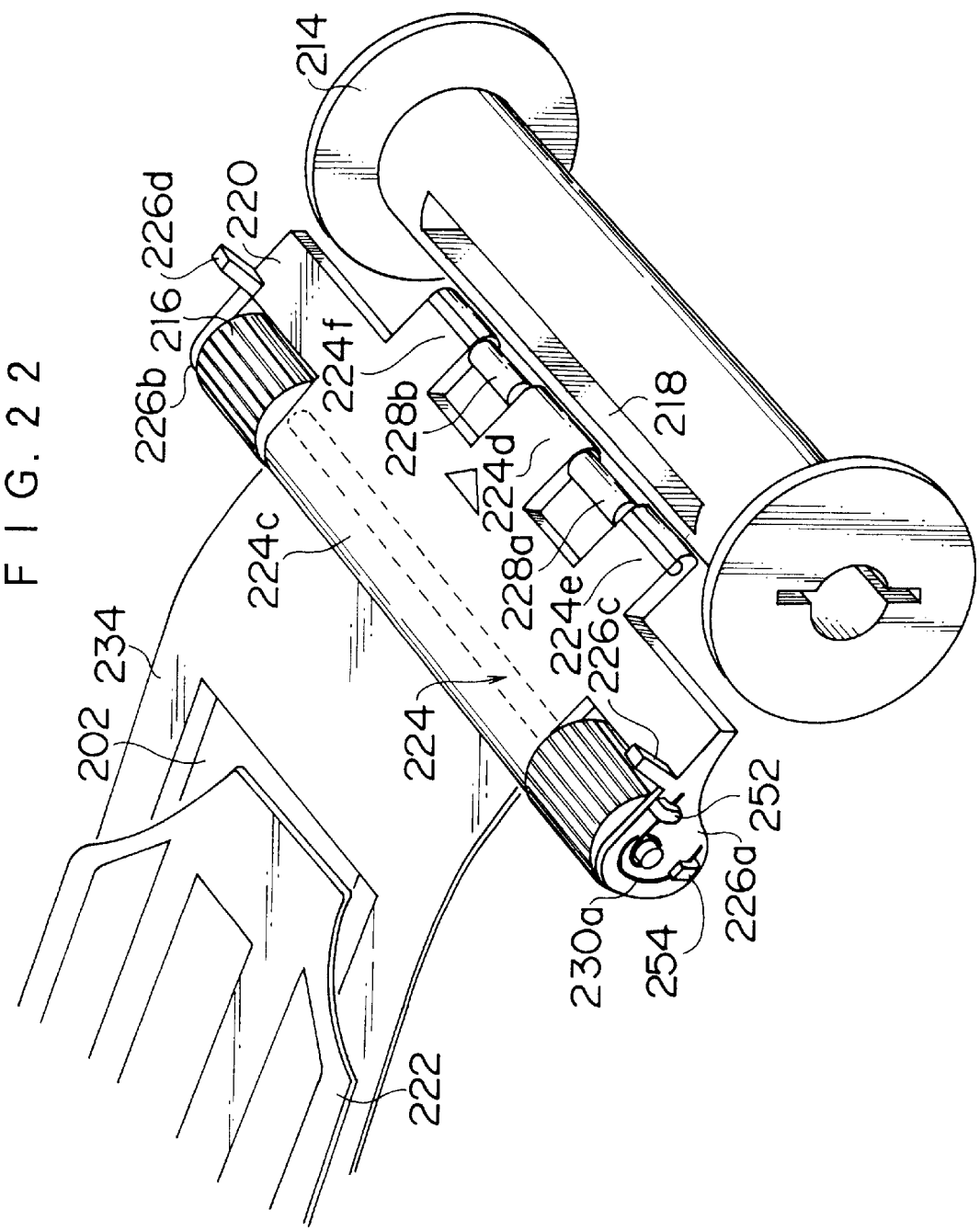

F I G. 2 3
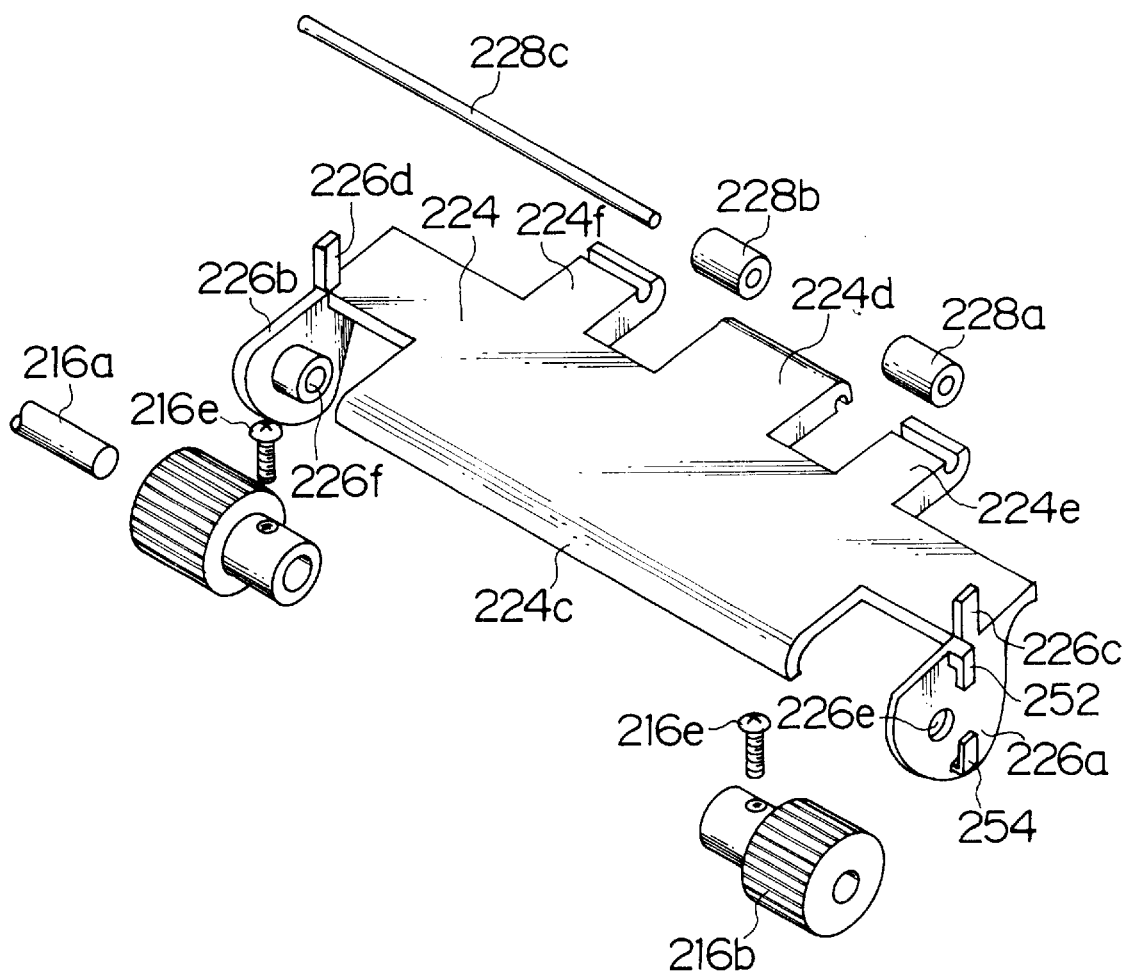

EXPOSURE AND VIEW FINDER ORIENTATION SWITCHING MECHANISM FOR A CAMERA

BACKGROUND OF THE INVENTION

1. Field of the Invention

The present invention relates to a camera with an image plane switching function, which is able to perform horizontal and vertical photographing according to a user's request, and a film winding device for winding Brownie film with no perforation around a film wind spool.

2. Description of the Related Art

If a camera using 135 mm film is held horizontally during photographing, a picture format is 24×36 mm (length×breadth). If the camera is held vertically, the picture format is 36×24 mm (length×breadth). In the case of a camera using 120 mm film, the picture format is a semi-brownie size: 6×4.5 cm (length×breadth) in the horizontal photographing or 4.5×6 cm (length×breadth) in the vertical photographing.

In a conventional film winding device, the perforations of the film are engaged with a sprocket when the film is loaded, and the motor rotates the sprocket so as to smoothly feed the film. When the film reaches the wind spool, the film is pressed against the wind spool by a guide which is pushed toward the wind spool. The perforations are engaged with nails formed on the wind spool, and the film is wound around the wind spool. Every time the exposure of a frame is completed, the sprocket and the film wind spool rotate, and the film is wound around the wind spool by the rotation.

The above-mentioned film winding device is mounted in a camera using a film such as 35 mm film provided with perforations. In the Brownie camera using the Brownie film without perforations, it is difficult to use the above-mentioned device which is driven by a motor to wind the leader of the film around the film wind spool.

When the film is loaded in the conventional Brownie camera, the user pulls the leader of the film from the film supply side with one hand, and rotates the film wind spool to position the film leader insertion hole of the film axis part at a predetermined position with the other hand, and inserts the leader of the film into the film leader insertion hole.

Most of the conventional cameras (the so-called compact lens shutter camera using 135 mm film) are rectangular along the film feed direction. A strobe is provided at the upper left of the front of the camera. When a person at a relatively short distance from the camera is stroboscopically taken, there is no problem about the shadow of the person. On the other hand, if the strobe is attached to the camera with the film image plane called the 120 Brownie, and when the person is stroboscopically taken by the camera which has been rotated by 90° from the horizontal position to be vertical, the position of the strobe light emitting part changes greatly. Thereby, the shadow close to the subject is taken, and the photograph is not easy to see and lacks a sense of beauty. Since the camera becomes larger and heavier in proportion to the picture format, the user cannot vertically hold the camera with the relatively-large image plane in a stable manner while photographing.

The conventional Brownie camera has another disadvantage in that the film cannot be easily loaded. The leader of the film often enters the gap between the film wind spool and the counter roller, not being inserted into the film leader insertion hole. For this reason, the operation of the conventional Brownie camera requires a lot of skill.

The camera of this type is not common in use because of the above-mentioned disadvantages.

SUMMARY OF THE INVENTION

The present invention has been developed under the above-stated circumstances, and has its object the provision of a camera with an image plane switching function, which is able to switch the horizontal photographing and the vertical photographing to each other without affecting the photographing while the camera is fixed, and a film winding device which prevents the leader of a Brownie film from getting into a gap between the counter roller and the film wind spool, and which can easily wind the leader of the Brownie film around the wind spool, and which can enable the beginner to easily load the film in the Brownie camera.

To achieve the above-mentioned object, in the present invention, an exposure frame switching member is switched to a horizontal photographing exposure frame or a vertical photographing exposure frame by operating a controlling element provided on an outer periphery of the camera.

According to the camera of the present invention, when the control element is operated, the exposure frame switching member is switched to the horizontal photographing exposure frame or the vertical photographing exposure frame, and thereby the horizontal photographing and the vertical photographing can be performed while the camera is held in a fixed position.

Moreover, according to the present invention, the finder visual field switching means switches the finder visual field to the horizontal photographing visual field or the vertical photographing visual field in connection with the operation of the control element. Thus, if the horizontal photographing and the vertical photographing are switched to each other while the camera is held in a fixed position, the user can easily know the photographic range.

On the other hand, in a film winding device for a Brownie camera in which a counter roller is provided adjacent to a film supplying side of a film wind spool winding a film, a film winding device of the present invention is provided with a plate-shaped guide member between the film wind spool and the counter roller, and the guide member guides a leader of the film fed from the film supplying side into a film leader insertion hole of the film wind spool.

Moreover, when said film wind spool winds said film, said guide member retreats to a position to allow winding of said film.

Furthermore, the guide member retreats in connection with closing action of a rear cover of said camera.

In addition, the guide member retreats to a middle retreating position in connection with the closing action of the rear cover of the camera, and then the guide member is pushed to the outside of a roll film as a diameter of the film wound around the film wind spool increases.

The film winding device of the present invention for a camera, which is provided with a counter roller adjacent to a film supply side of the film wind spool winding the film, is characterized in that: a diameter of a center of the counter roller is smaller than a diameter of an end of the counter roller; a plate-shaped guide member is provided between the film wind spool and the counter roller, and the guide member guides the leader of the film fed from the film supply side into a film leader insertion hole of the film wind spool; and a one-end edge of the counter roller side of the guide member projects toward the center of the counter roller so that the one-end edge can be close to the center of the counter roller.

The center of the counter roller is between two film sliding parts of the counter roller, which are arranged to correspond to both sides of the running film in the direction of the film width.

The one-end edge is preferably curved along the outer surface of the center of the counter roller.

A guide roller for guiding the film is provided at the other-end edge of the film wind spool side of the guide member, and the guide roller is preferably divided into a plurality of guide rollers across the other-end edge.

Moreover, the guide member is preferably constructed in such a manner that when the film wind spool winds the film, the guide member retreats to a position allowing the winding operation.

Moreover, the guide member is preferably constructed in such a manner as to retreat in connection with the closing action of a rear cover of the camera.

Furthermore, the guide member retreats to a middle retreating position in the first retreating action in connection with the closing action of the rear cover of the camera, and then the guide member is pushed out of the roll film in the second retreating action with the increase in the diameter of the roll film wound around the film wind spool.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 19 is a perspective view of a film winding device according to the third embodiment the present invention;

FIG. 20 is a sectional view illustrating the structure of a guide plate of the device in FIG. 19;

FIG. 21 is an exploded perspective view illustrating the structure of the guide plate of the device in FIG. 19;

FIG. 22 is a perspective view of a film winding device according to the fourth embodiment of the present invention; and FIG. 23 is an exploded perspective view illustrating the structure of the guide plate of the device in FIG. 22.

DETAILED DESCRIPTION OF THE PREFERRED EMBODIMENTS

Figure 1:
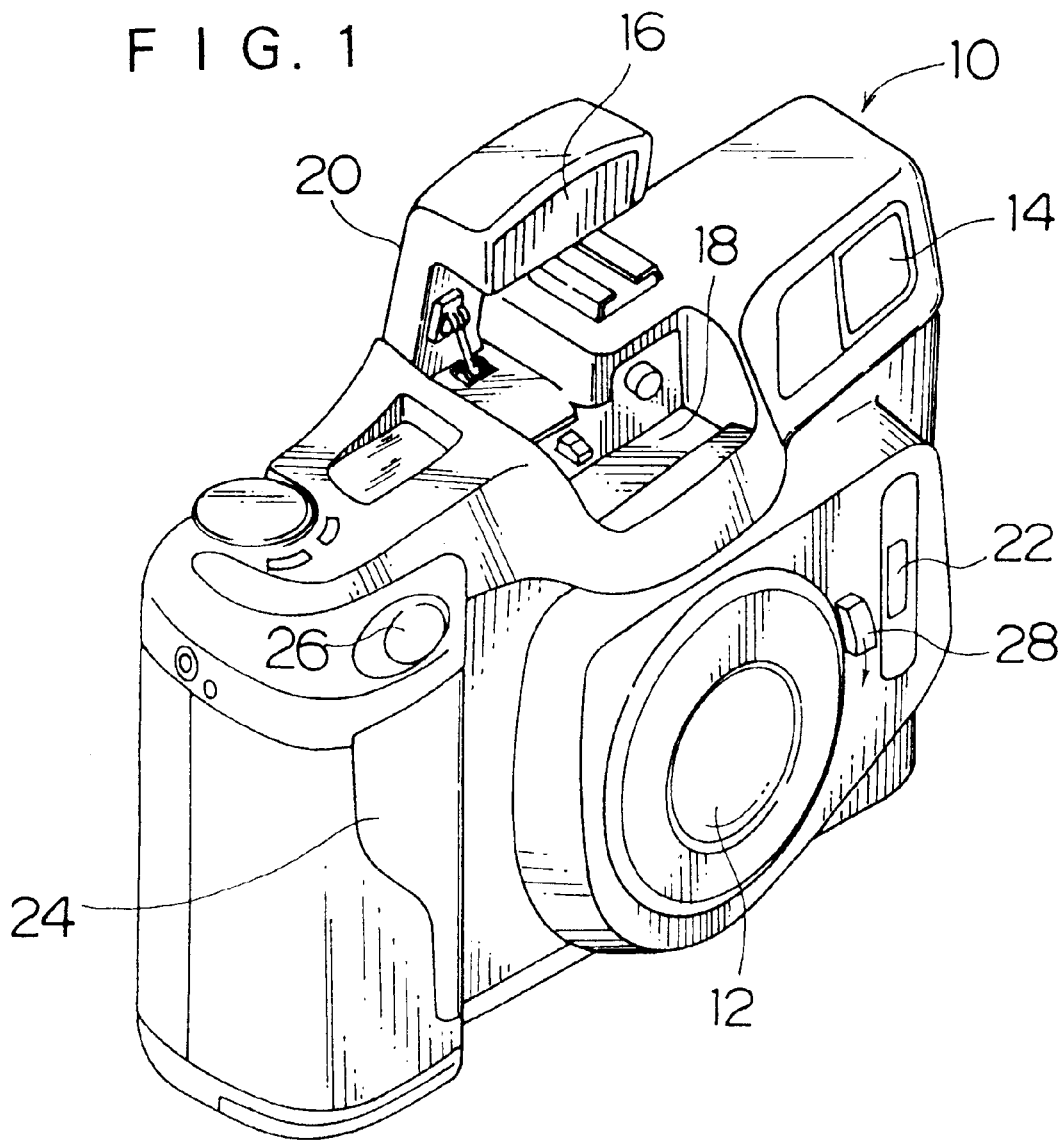
FIG. 1 is a perspective view illustrating a camera with an image plane switching function according to the first embodiment of the present invention.

FIG. 1 is a perspective view illustrating a camera with an image plane switching function according to the present invention. The camera with the image plane switching function is an auto-focus camera using 120 mm film. A taking lens 12 is arranged substantially at the center of the front of a camera body 10, and an illuminated finder 14 is arranged at the upper right corner of the camera body 10. A strobe 16 is provided above the taking lens 12. The strobe 16 is of a pop-up type, and it is attached to the camera body 10 via a strobe case 20, which is supported by a top concave part 18 of the camera body 10 in such a manner as to rise and fall freely. When the strobe case 20 is folded, the strobe 16 is housed in the concave part 18, and when the strobe case is put in an upright position, the strobe 16 is positioned above the camera body 10 as shown in FIG. 1.

An AF light emitting and receiving part 22 is arranged at the right of the taking lens 12. A grip 24 is formed at the left side of the camera body 10, and a shutter button 26 is arranged at the top of the grip 24. If the user holds the grip 24, and presses the shutter button 26 with the camera body 10 being horizontal as shown in FIG. 1, the 120 mm film is exposed in a size of 6×4.5 cm (length×breadth).

A switching lever 28 is attached to the right of the taking lens 12. The switching lever 28 is provided at a position where it can be manipulated by the user's left hand holding the camera body 10. When the switching lever 28 is operated, the exposure frame of the camera is switched to a horizontal photographing exposure frame (6×4.5 cm) for photographing by the camera which is held horizontally, or a vertical photographing exposure frame (4.5×6 cm) for photographing by the camera with the image plane switching function which is held vertically.

Figure 2:
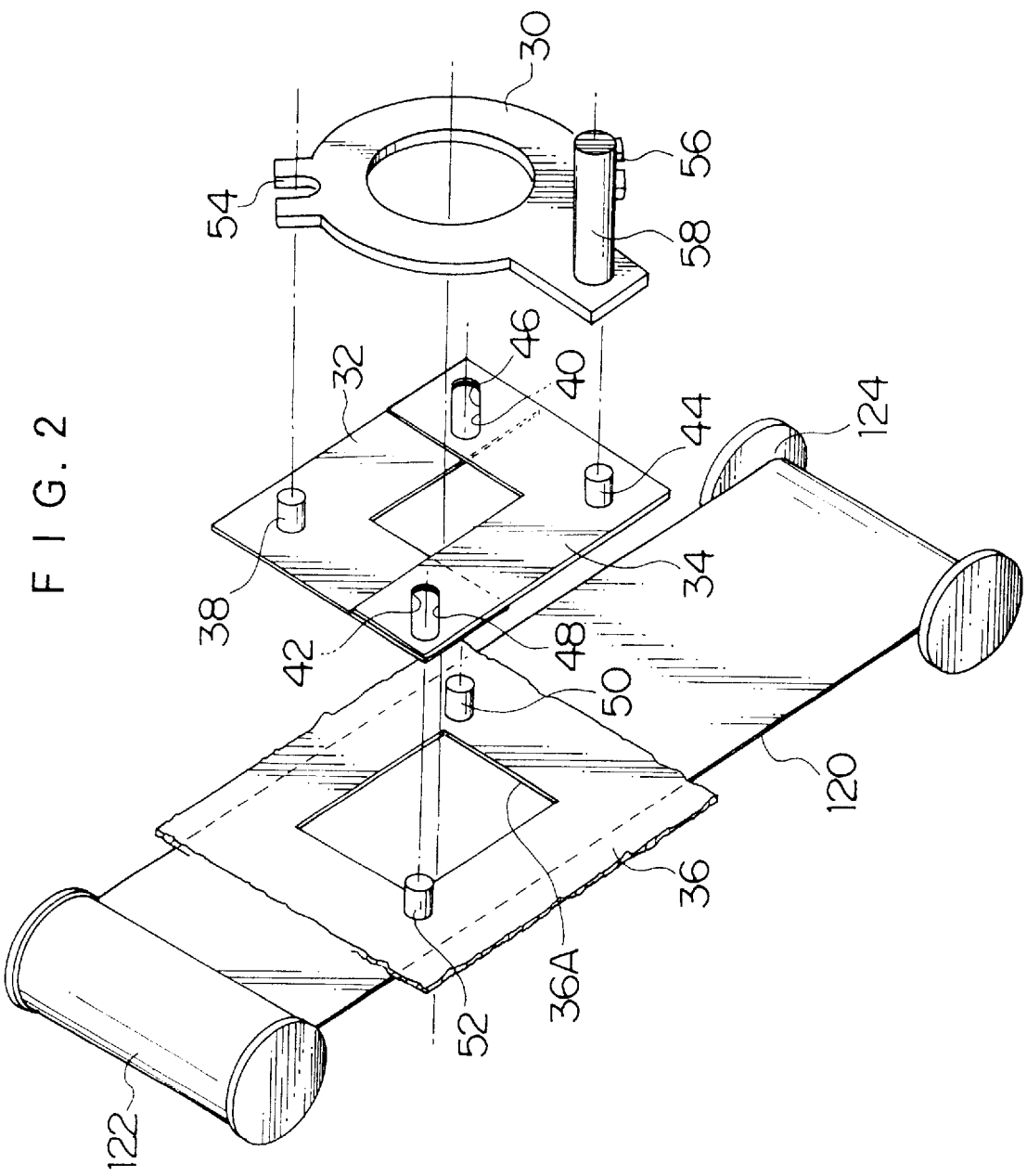
FIG. 2 is a perspective view illustrating an exposure frame switching mechanism used in the camera with the image plane switching function in FIG. 1.

FIG. 2 is a perspective view illustrating the exposure frame switching mechanism. The exposure frame switching mechanism consists of the switching lever 28 in FIG. 1; a driving wheel 30 working in connection with the switching lever 28; and two switching frames 32 and 34 for switching the shape of the exposure frame in accordance with the action of the driving wheel 30.

The switching frames 32 and 34 are L-shaped, and they are arranged above a film exposure frame 36 of the camera. The film exposure frame 36 is provided on a light-tight cylinder (not shown) of the camera, and an opening 36A of the film exposure frame 36 is in such a size as to include the horizontal photographing exposure frame and the vertical photographing exposure frame. A nib pin 38 and elongated holes 40 and 42 are formed at the switching frame 32. Likewise, a nib pin 44 and elongated holes 46 and 48 are formed at the switching frame 34. These switching frames 32 and 34 are stacked so that the elongated holes 40 and 46 can be engaged with nib pins 50 and the elongated holes 42 and 48 can be engaged with nib pins 52 which project from the exposure frame 36. The driving wheel 30 is arranged above the switching frames 32 and 34. The driving wheel 30 is attached so that the nib pins 38 and 44 of the switching frames 32 and 34 can be engaged with long grooves 54 and 56 formed at the peripheral edge. A pin 58 is formed at the driving wheel 30 to project therefrom. The pin 58 is engaged with a long groove 60 (see FIGS. 3, 4 and 10) of the switching lever 28 in such a manner that it can be slidable.

Figure 3:
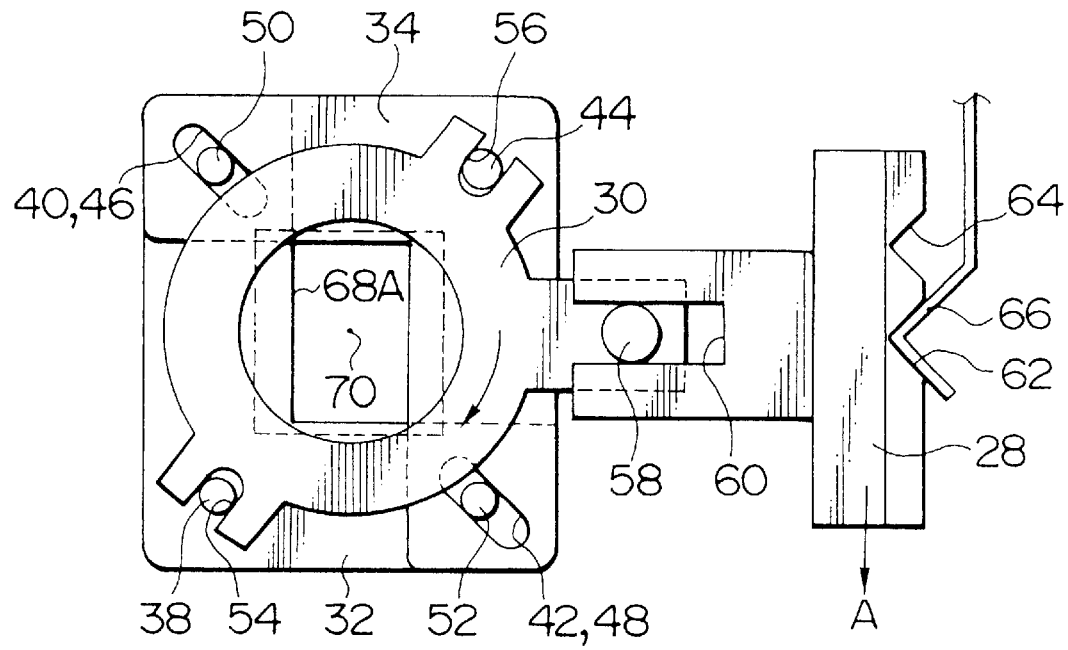
FIG. 3 is a view illustrating positions of switching frames switched to a horizontal photographing position.
Figure 4:
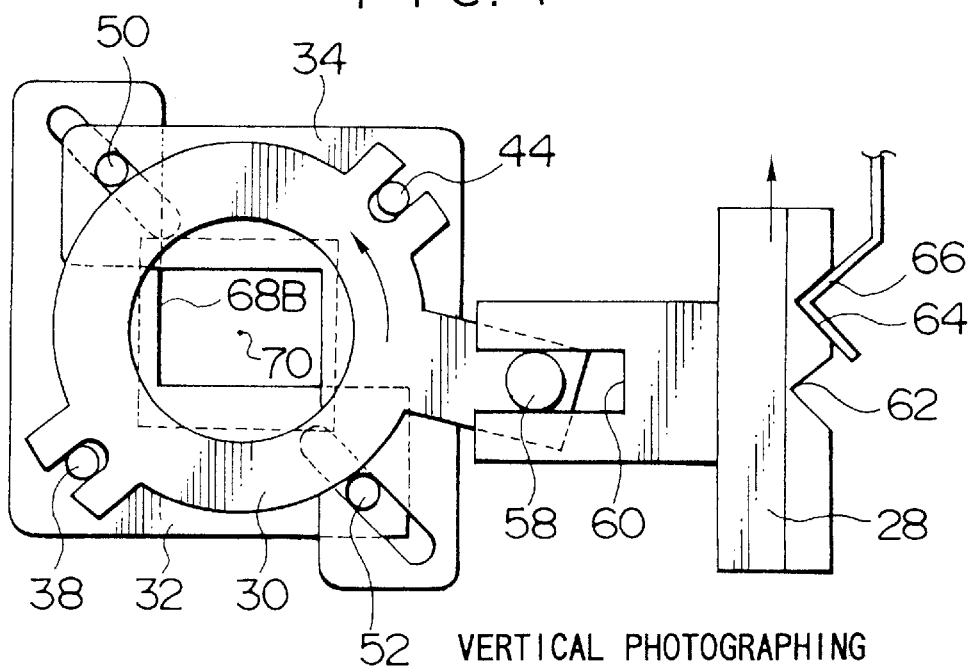
FIG. 4 is a view describing illustrating positions of switching frames switched to a vertical photographing position.

Two click grooves 62 and 64 are formed at the switching lever 28 as depicted in FIGS. 3 and 4. A click spring 66 is fixed to the camera body 10, and the click spring 66 is engaged with one of the click grooves 62 and 64. When the click spring 66 is engaged with the click groove 62, the switching lever 28 is regulated to be positioned for the horizontal photographing (see FIG. 3). When the click spring 66 is engaged with the click groove 64, the switching lever 28 is regulated to be positioned for the vertical photographing (see FIG. 4).

Next, an explanation will be given about the operation of the exposure frame switching mechanism with reference to FIGS. 3 and 4. FIG. 3 illustrates the positions of the switching frames 32 and 34 in the case when the switching lever 28 is switched to the horizontal photographing position. FIG. 4 illustrates the positions of the switching frames 32 and 34 in the case when the switching lever 28 is switched to the vertical photographing position.

Figure 5:
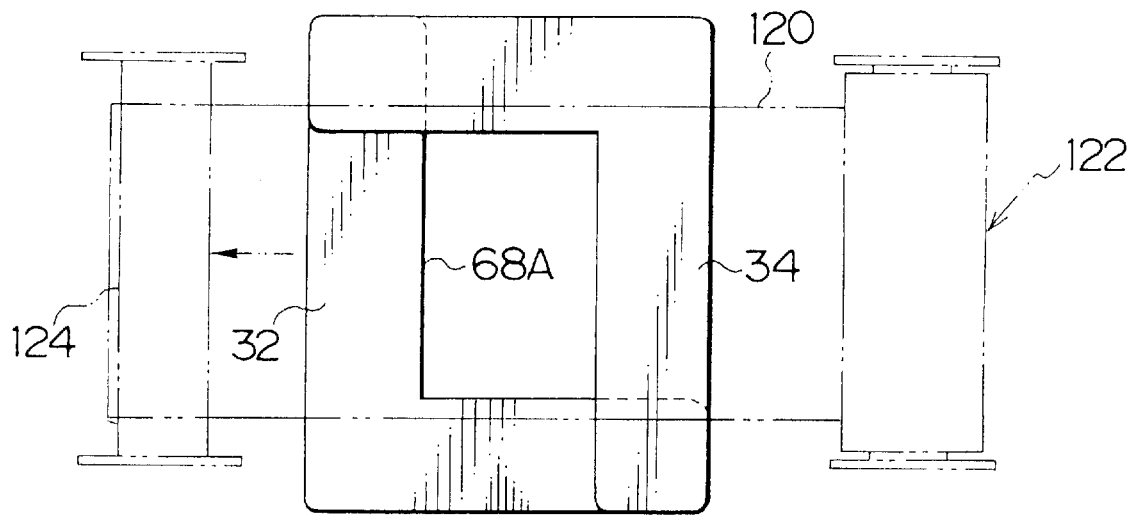
FIG. 5 is a conceptional view illustrating a positional relationship between a horizontal photographing exposure frame and film.

If the switching lever 28 is controlled to be positioned for the horizontal photographing as shown in FIG. 3, a square exposure frame 68A formed by the switching frames 32 and 34 is the size of 6×4.5 cm (length×breadth). When the user horizontally holds the camera to take pictures (see FIG. 1), the 120 mm film is exposed in the picture format of 6×4.5 cm. FIG. 5 is a conceptional view illustrating a positional relationship between the horizontal photographing exposure frame 68A and 120 mm film. The film 120 is pulled out from roll film 122 and exposed on the exposure frame 68A. Then, a windup reel 124 winds up the film 120.

Figure 6:
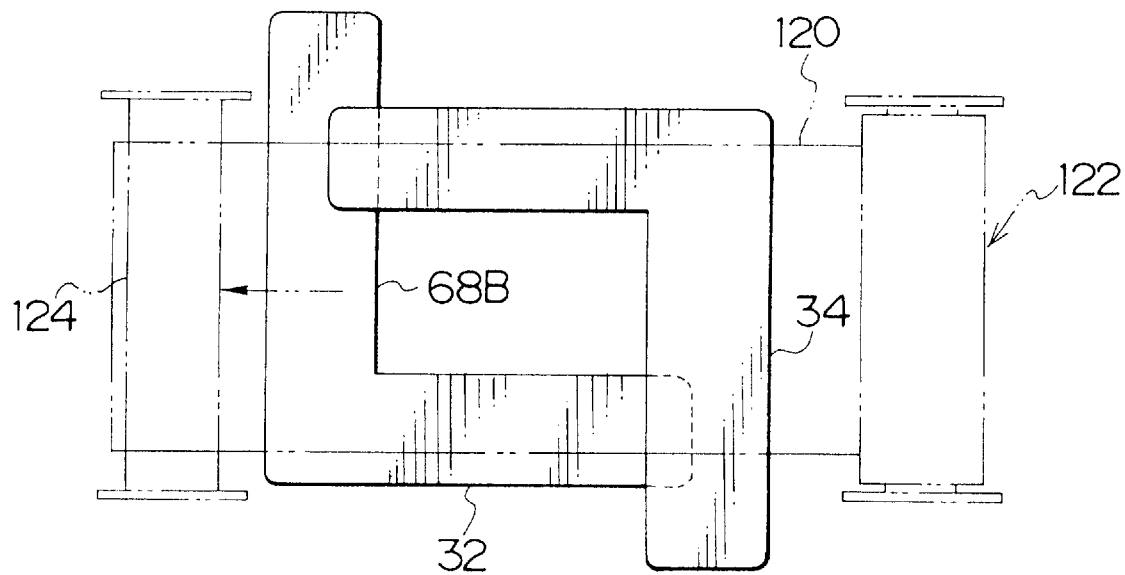
FIG. 6 is a conceptional view illustrating a positional relationship between a vertical photographing exposure frame and film.

Next, when the switching lever 28 moves in a direction of an arrow A in FIG. 3, the driving wheel 30 rotates about a taking axis 70 in the clockwise direction in the drawing. When the driving wheel 30 starts rotating, the nib pins 38 and 44 are pushed by the long grooves 54 and 56 of the driving wheel 30. Thereby, the switching frames 32 and 34 start moving at an angle of 45° in which they become closer to each other due to the operation of the nib pin 50 and the elongated holes 40 and 46, and the operation of the nib pin 52 and the elongated holes 42 and 48. Then, as shown in FIG. 4, when the click spring 66 is engaged with the click groove 64, and the switching lever 28 is regulated to be positioned at the vertical photographing position, a square exposure frame 68B formed by the switching frames 32 and 34 is the size of 4.5×6 cm (length×breadth). When the user horizontally holds the camera to take pictures in this state, the 120 mm film is exposed in the picture format of 4.5×6 cm. FIG. 6 is a conceptional view showing a positional relationship between the vertical photographing exposure frame 68B and the film 120.

Thus, the camera with the image plane switching function of this embodiment has an advantage in that it is possible to perform the horizontal photographing and the vertical photographing with the camera kept horizontal, only by operating the switching lever 28.

If holding the camera vertically is easier for the user in view of the design of the camera, and when the horizontal photographing is selected by the switching lever 28, the 120 mm film is exposed in the picture format of 4.5×6 cm. If the vertical photographing is selected, the 120 mm film is exposed in the picture format of 6×4.5 cm. That is, the camera with the image plane switching function can perform both the horizontal photographing and the vertical photographing even when the camera is held vertically. Thus, the camera with the image plane switching function does not have to be moved. If the camera of this embodiment is applied to the camera with the image plane switching function which has a disadvantage in that the shadow of the subject close to the subject is taken, the vertical photographing can be performed by the horizontally-held camera, so that the shadow is not taken.

In this embodiment, the exposure frames are switched by manual operation of the switching lever 28. The present invention, however, is not restricted to this. The exposure frames may be switched by an electric means (not shown). In this embodiment, it is preferable to control the film feed length in connection with the switching of the picture format.

In this embodiment, the camera with the image plane switching function exposes the 120 mm film in the semi-brownie size. The present invention is applicable to the camera with the image plane switching function which exposes the 120 mm film in the size of 6×6 cm. In this case, the film is exposed in one size whether the camera is held horizontally or vertically during photographing. However, the camera with the image plane switching function is generally designed in such a manner that the AF light projecting and receiving part, the AE light projecting and receiving part, etc. are arranged to be suitable for the horizontal photographing. For this reason, if the camera is kept vertical during the photographing, the photographing may not be performed under the ideal condition. On the other hand, in the case of the camera with the image plane switching function, the vertical photographing can be performed even if the camera is held horizontally; thus, the camera of this embodiment can be applied to the camera with the image plane switching function in general. In this case, since the size of the picture plane does not change, it is preferable to print or put a mark which indicates, after development, whether the camera was held horizontally or vertically to take the pictures.

Figure 7:
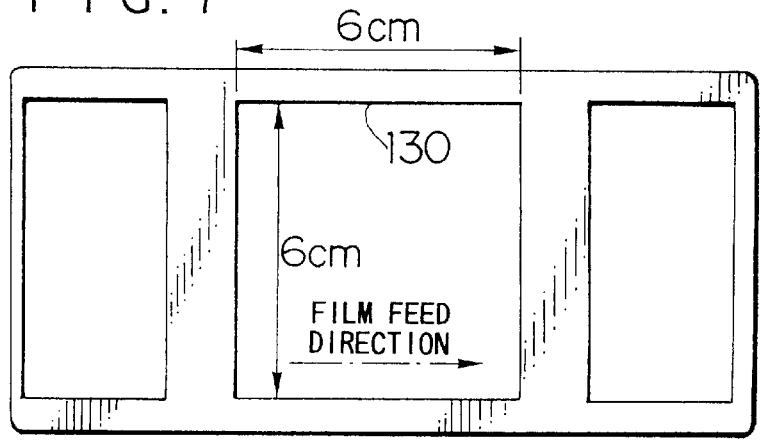
FIG. 7 is a view illustrating an exposure frame of 6×6 cm.
Figure 8:
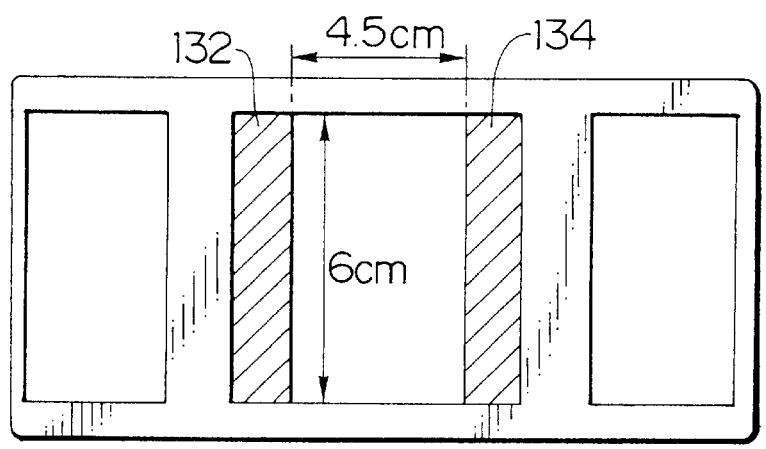
FIG. 8 is a view illustrating positions of mask plates switched to a horizontal photographing position.
Figure 9:
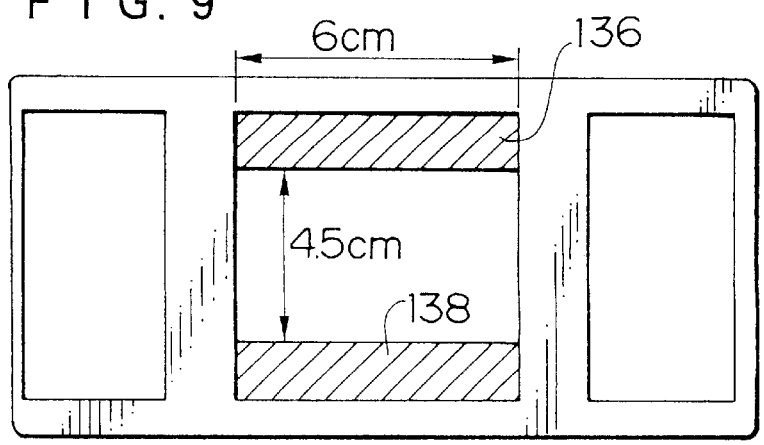
FIG. 9 is a view illustrating positions of mask plates switched to a vertical photographing position.

FIG. 7 is a rear view of a camera which has a fixed exposure frame 130 of 6×6 cm. A pair of mask plates 132 and 134 in FIG. 8 are attached to the exposure frame 130 so that they can move inward and outward in the exposure frame 130. A pair of mask plates 136 and 138 are attached to the exposure frame 130 so that they can move inward and outward in the exposure frame 130 as shown in FIG. 9. The pair of mask plates 132 and 134 and the pair of the mask plates 136 and 138 are selectively moved by operating the switching lever 28. That is, when the switching lever 28 is switched to the horizontal photographing position, the mask plates 136 and 138 move outward in the exposure frame 130, and the mask plates 132 and 134 move inward in the exposure frame 130. Thereby, the exposure frame 130 is switched to the 6×4.5 cm (length×breadth) format as shown in FIG. 8. When the switching lever 28 is switched to the vertical photographing position, the mask plates 132 and 134 move outward in the exposure frame 130, and the mask plates 136 and 138 move inward in the exposure frame 130. Thereby, the exposure frame 130 is switched to the 4.5×6 cm (length×breadth) format as shown in FIG. 9.

Figure 10:
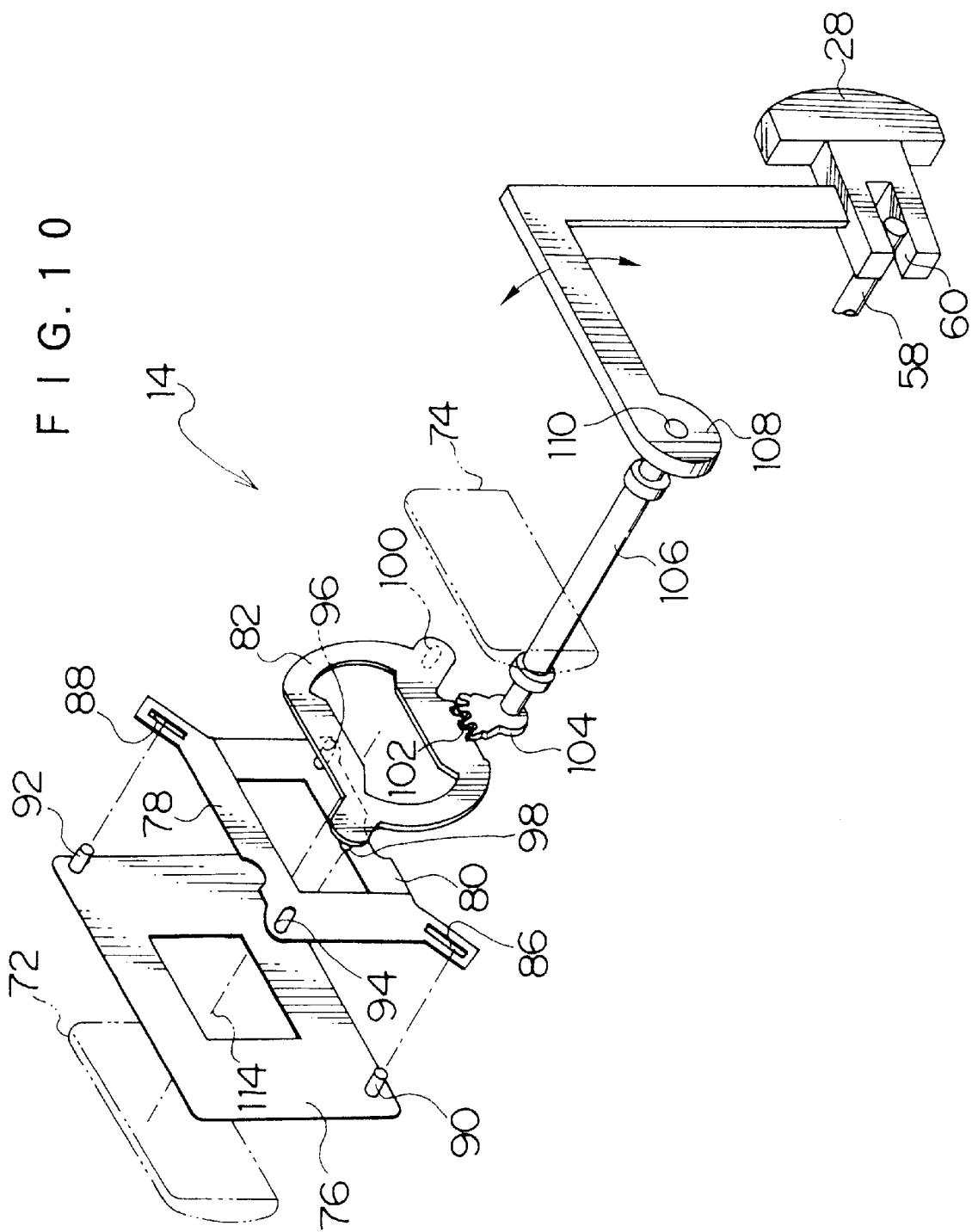
FIG. 10 is a view illustrating a finder visual field switching mechanism of the camera with the image plane switching mechanism in FIG. 1.

FIG. 10 illustrates the structure of the finder 14 which is used in the camera with the image plane switching function in this embodiment. A finder visual field switching mechanism is provided between an objective lens 72 and an eyepiece 74 of the finder 14.

A visual field frame 76 provided at the back of the objective lens 72 includes a horizontal visual field and a vertical visual field of the camera. A pair of L-shaped visual field frames 78 and 80 are provided at the back of the visual field frame 76, and the visual field frames 78 and 80 switch the horizontal visual field and the vertical visual field. The visual field frames 78 and 80 are moved at an angle of 45° by the operation of a later-described visual field frame switching lever 82 in a direction in which they can become closer or farther away from each other. Thereby, the visual field is switched to the horizontal visual field or the vertical visual field.

Figure 11:
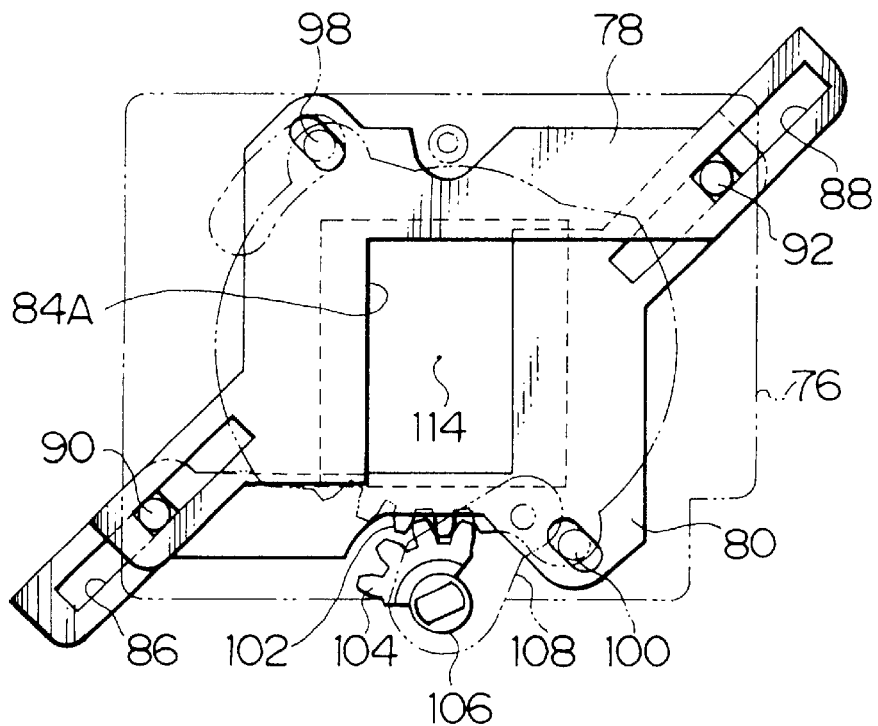
FIG. 11 is a view describing a finder visual field switched to the horizontal photographing position.
Figure 12:
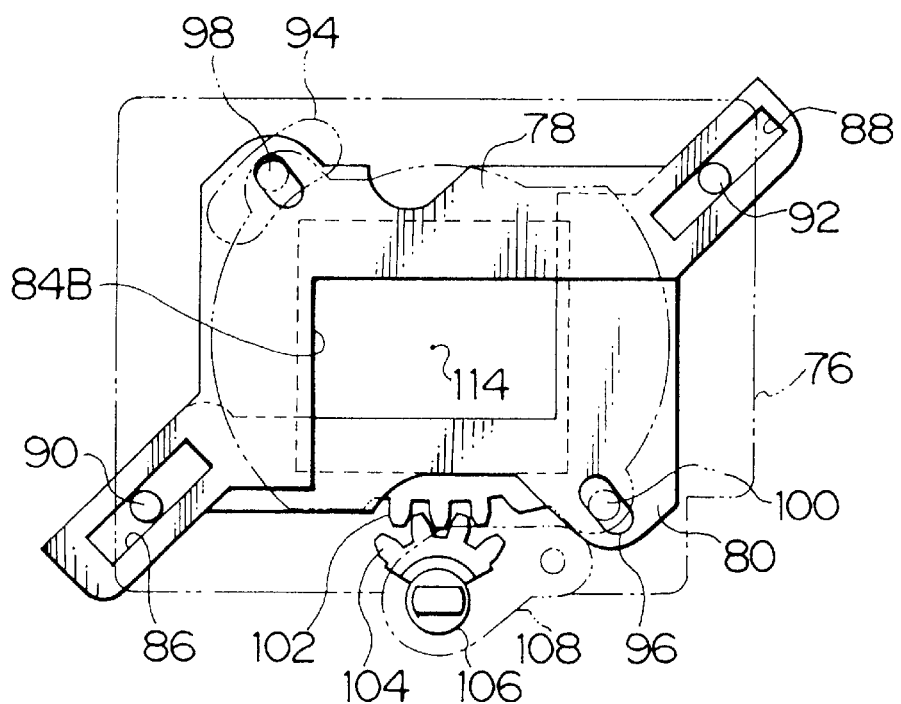
FIG. 12 is a view describing a finder visual field switched to the vertical photographing position.

When the visual field frames 78 and 80 move at an angle of 45° to become closer to each other, the sides facing to the right and the left of the visual field frames 78 and 80 move in such a direction as to become closer to each other, and the sides facing to the top and the bottom of the visual field frames 78 and 80 move in such a direction as to become farther apart from each other. Thereby, a horizontal visual field frame 84A in FIG. 11 is formed. When the visual field frames move away from each other at an angle of 45°, the sides facing to the top and the bottom of the visual field frames 78 and 80 move in such a direction as to become closer to each other, and the sides facing to the right and the left of the visual field frames 78 and 80 move in such a direction as to become farther away from each other. Thereby, a vertical visual field 84 B in FIG. 12 can be formed.

In FIG. 10, elongated holes 86 and 88 are formed at an angle of 45° at both ends of the visual field frames 78 and 80. The elongated holes 86 and 88 are engaged with nib pins 90 and 92 which project from the visual field frame 76. Elongated holes 94 and 96 are formed in a close proximity to the corners of the visual field frames 78 and 80. The elongated holes 94 and 96 are engaged with pins 98 and 100 which project from the visual field frame switching lever 82.

On the other hand, a gear 102 is formed at the bottom of the visual field frame switching lever 82, and the gear 102 is engaged with a switching gear 104. The switching gear 104 is fixed to one end of a visual field frame switching axis 106. A L-shaped rotary lever 108 is provided at the other end of the visual field switching axis 106 with a pin 110 being a fulcrum. The bottom of the rotary lever 108 is secured to the switching lever 28. Thus, the rotary lever 108 is able to rotate in connection with the switching action of the switching lever 28.

Next, an explanation will be given about the operation of the finder visual field switching mechanism which is constructed in the above-mentioned manner. When the switching lever 28 is moved to the horizontal photographing position shown in FIG. 3, the rotary lever 108 in FIG. 10 rotates on the pin 110 in the counterclockwise direction in the drawing. The visual field switching axis 106 rotates in connection with the above-mentioned rotation of the rotary lever 108, and the switching gear 104 rotates in the counterclockwise direction in the drawing. The visual field frame switching lever 82 rotates clockwise on a finder optical axis 114 in connection with the rotation of the switching gear 104. Then the rotation of the visual field switching lever 82 is transmitted to the switching frames 78 and 80, and the visual field frame 78 moves up at an angle of 45°, and the visual field frame 80 moves down at an angle of 45°. Thereby, the finder visual field is determined as the horizontal visual field shown in FIG. 11.

Next, when the switching lever 28 is moved to the vertical photographing position in FIG. 4, the rotary lever 108 rotates clockwise on the pin 110. Then, the visual field switching axis 106 rotates in an opposite direction, and the switching gear 104 rotates in the clockwise direction in the drawing. The rotation of the switching fear 104 rotates the visual field frame switching lever 82 counterclockwise. Then the rotation of the visual field frame switching lever 82 is transmitted to the switching frames 78 and 80, and the visual field frame 78 moves down at an angle of 45°, and the visual field frame 80 moves up at an angle of 45°. Thereby the finder visual field is determined as the vertical visual field shown in FIG. 12, even if the vertical photographing and the horizontal photographing are switched to each other while the camera with the image plane switching function is kept in a fixed position.

Thus, in the camera with the image plane switching function according to this embodiment, the finder visual field is switched to the horizontal position or the vertical position in connection with the switching action of the exposure frame. For this reason, the user can easily know the scope of photographing.

In this embodiment, the finder visual field is switched by means of the switching frames 78 and 80. In a liquid crystal finder using a liquid crystal display, however, the finder visual field may be electrically controlled in connection with the operation of the switching lever 28.

In this embodiment, the camera using the suitable 120 mm film switches the picture format to the 6×4.5 cm format and the 4.5×6 cm format. The present invention, however, is applicable to the camera with the image plane switching function using another film such as 220 mm film and 135 mm film.

Figure 14:
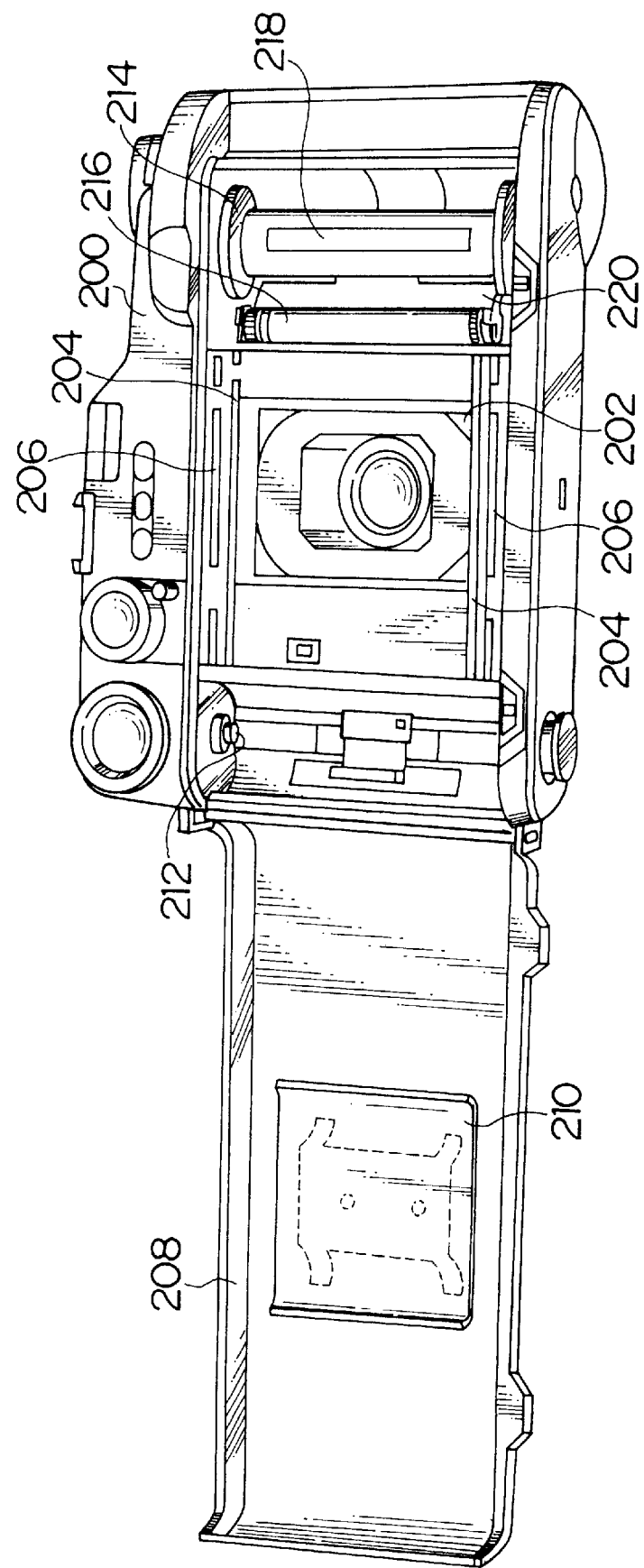
FIG. 14 is a perspective view illustrating the inside of the camera provided with the film winding device in FIG. 13.

FIG. 14 illustrates the inside of the back of a Brownie camera provided with a film winding device according to the first embodiment of the present invention. Inner guide rails 204 are provided above and below an aperture 202 formed at the back of a body 200 of the Brownie camera, and the film (the Brownie film) runs on the inner guide rails 204 with its face contacting the inner guide rails 204. Outer guide rails 206 are provided at the outside of the inner guide rails 204, and the end faces at both sides of the film are guided by the outer guide rails 206.

When a rear cover 208 is closed, a film pressure plate 210, which is provided on the inner wall of the rear cover 208, comes into contact with the outer guide rails 206. A gap (tunnel) is formed between the film pressure plate 210 and the inner guide rails 204 so that the film can run through the gap.

Points 212 are provided on the top and bottom walls at one side end of the body 200, and the points 212 hold a film supplying spool around which unexposed film is mounted. A film wind spool 214 for winding the film is provided at the other end of the body 200, and an axially-rotatable counter roller 216 is provided close to the aperture 202 side of the film wind spool 214. The axis of the film wind spool 214 is parallel to the axis of the counter roller 216.

A film leader insertion hole 218 is punched in the film wind spool 214, and the film leader (the tip of film leader paper) is inserted into the film leader insertion hole 218. A motor (not shown) drives the film wind spool 214, which is rotated by a winding spool rotating means having a gear train (not shown) as a power transmission mechanism.

A mask disc (not shown) is axially supported by a rotational axis of the counter roller 216, and a plurality of transparent hole are punched along the circumference of the mask disc. The number of the counter roller 216's rotations and the exposed frames on the film can be calculated with an LED and a photo-diode, which face each other across the mask disc.

The Brownie film used in the above-mentioned Brownie camera is not provided with perforations, and the camera is not provided with a sprocket engaged with perforations. For this reason, unlike the 35 mm film, the film cannot be automatically fed by the rotation of the sprocket engaged with the perforations. The user has to pull out the leader of the film wound around the film supply spool in the film winding direction with one hand, and rotates the film wind spool 214 with the other hand so that the leader of the film can be easily inserted into the film leader insertion hole 218. In such a state, the user must insert the leader of the film into the film leader insertion hole 218.

However, inserting the leader of the film requires skill, and the leader of the film often enters the gap between the film wind spool 214 and the counter roller 216.

If the leader of the film is not completely inserted into the film leader insertion hole 218, the roll film gets loose and becomes too thick while the film is wound. Thus, the film cannot be wound properly.

Figure 13:
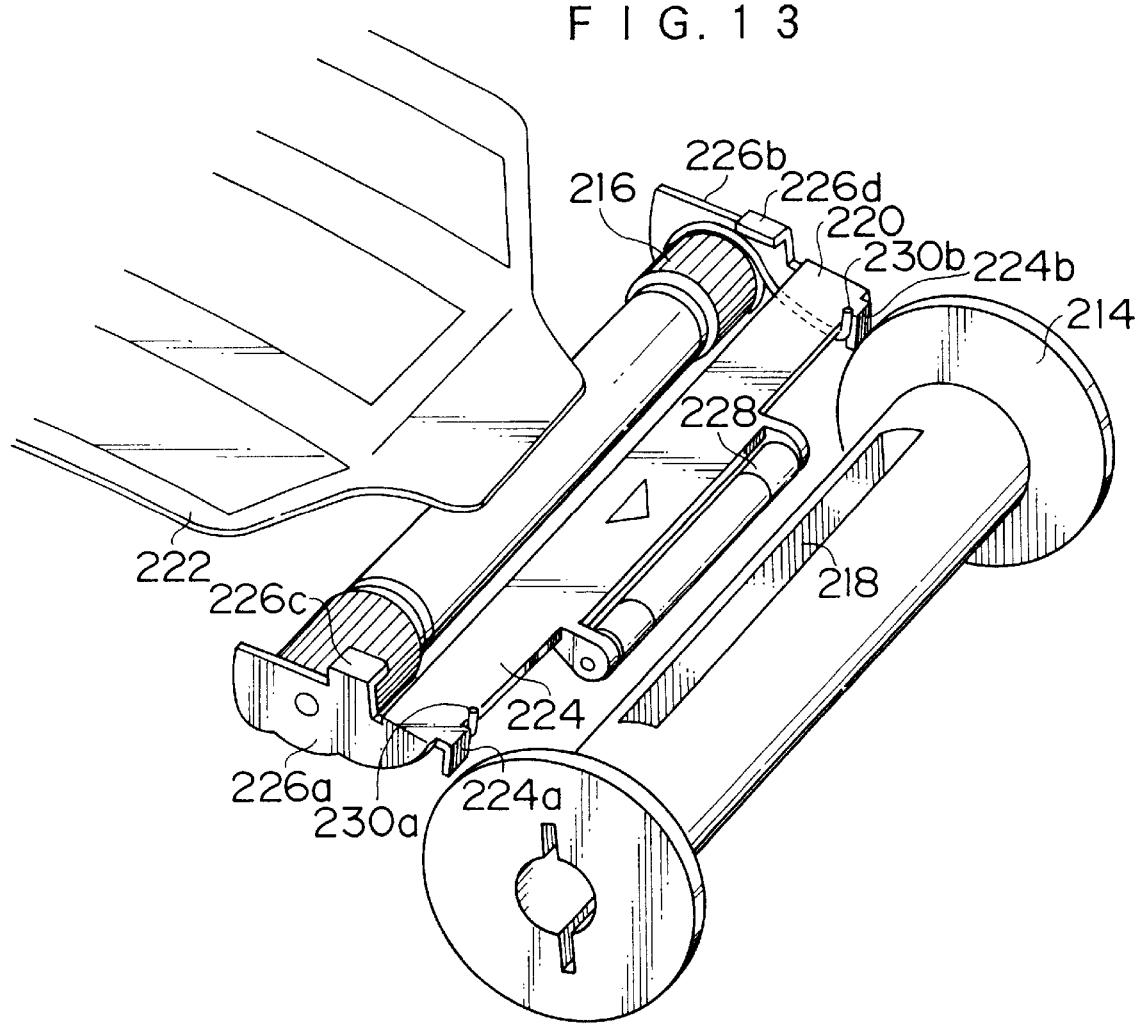
FIG. 13 is a perspective view of a film winding device according to the first embodiment of the present invention.

In the device according to the first embodiment of the present invention, as shown in FIG. 13, a movable guide member 220 is provided between the film wind spool 214 and the counter roller 216, and the movable guide member 220 guides the leader of film 222 so that the leader can be easily inserted into the film leader insertion hole 218 of the film wind spool 214.

The movable guide member 220 is provided with a flat guide plate 224, and two bending pieces 226a and 226b which are axially supported by the rotational axis of the counter roller 216 at both ends thereof. A long and thin film abutting roller 228 is supported by the edge of the guide plate 224 so that it can be axially rotatable.

The leader of the film 222 pulled out from the film supplying spool passes the counter roller 216, and it is guided along the guide plate 224 to be inserted into the film leader insertion hole 218 of the film wind spool 214.

The guide plate 224 of the movable guide member 220 is positioned between the counter roller 216 and the film wind spool 214, so that the leader of the film 222 can be smoothly inserted into the film leader insertion hole 218 of the film wind spool 214 without entering the gap between the counter roller 216 and the film wind spool 214.

When the leader of the film 222 is inserted into the film leader insertion hole 218, the movable guide member 220 bridges the gap between the counter roller 216 and the film wind spool 214 as shown in FIG. 13. If the rear cover 208 is closed after the leader of the film 222 is inserted into the film insertion hole 218 and the film 222 is wound around the film wind spool 214 in accordance with the rotation of the spool 214, the guide plate 224 of the movable guide member 220 is pushed down so that a gap can be formed between the counter roller 216 and the winding spool 214.

That is, when the film wind spool 214 winds the film 222, the movable guide member 220 retreats to a position allowing for the winding operation. Thereafter, the film wind spool 214 can smoothly wind the film 222 without being disturbed by the movable guide member 220.

When the movable guide member 220 retreats, the guide member 220 is pushed down to a middle retreating position by the closing action of the rear cover 208, and then the guide member 220 is pushed toward the outside of the roll film 222, that is, toward a film chamber wall 200a as the diameter of the film 222 wound around the film wind spool 214 increases.

Figure 15:
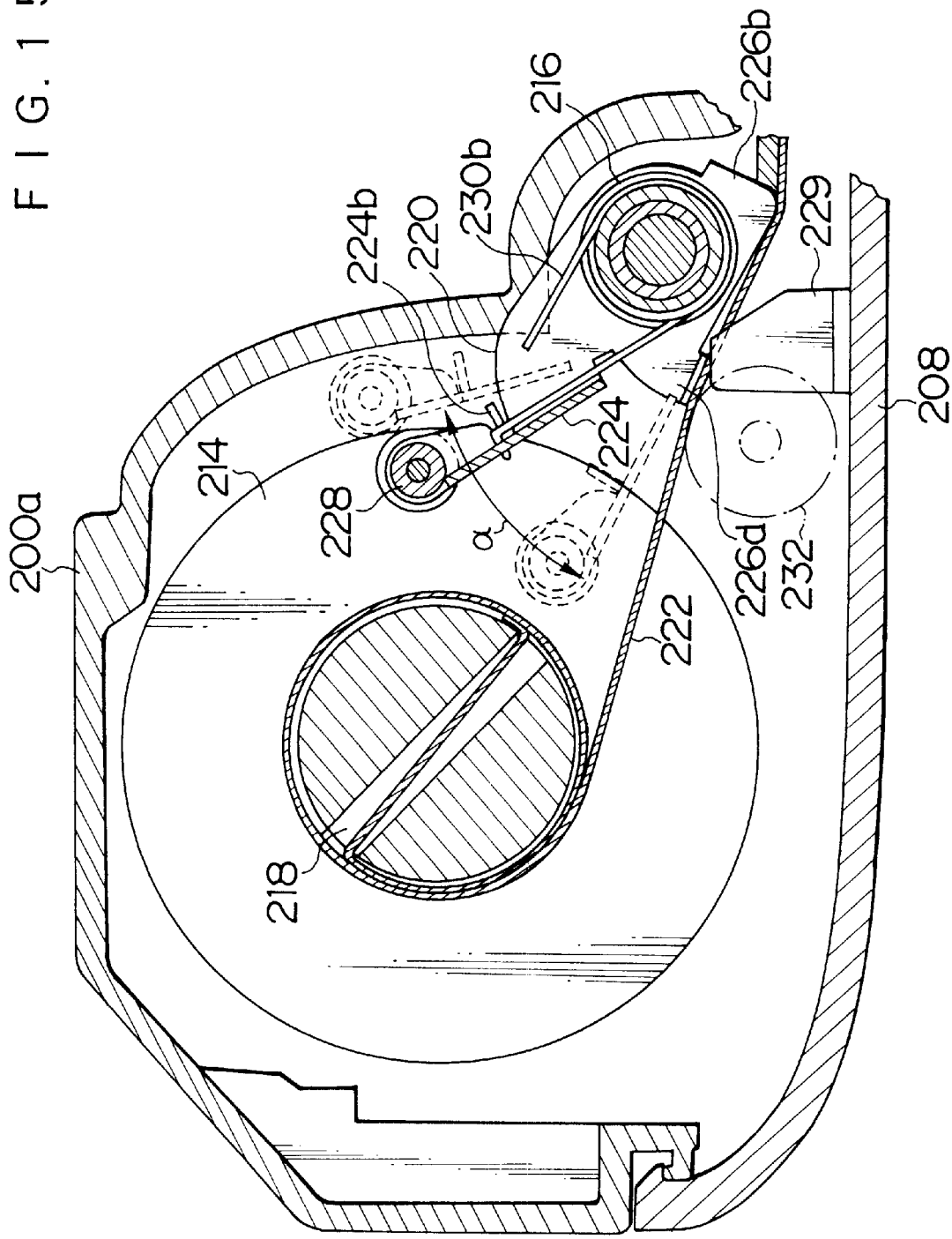
FIG. 15 is a sectional view describing the film winding device in FIG. 13 (when the film winding is started)
Figure 16:
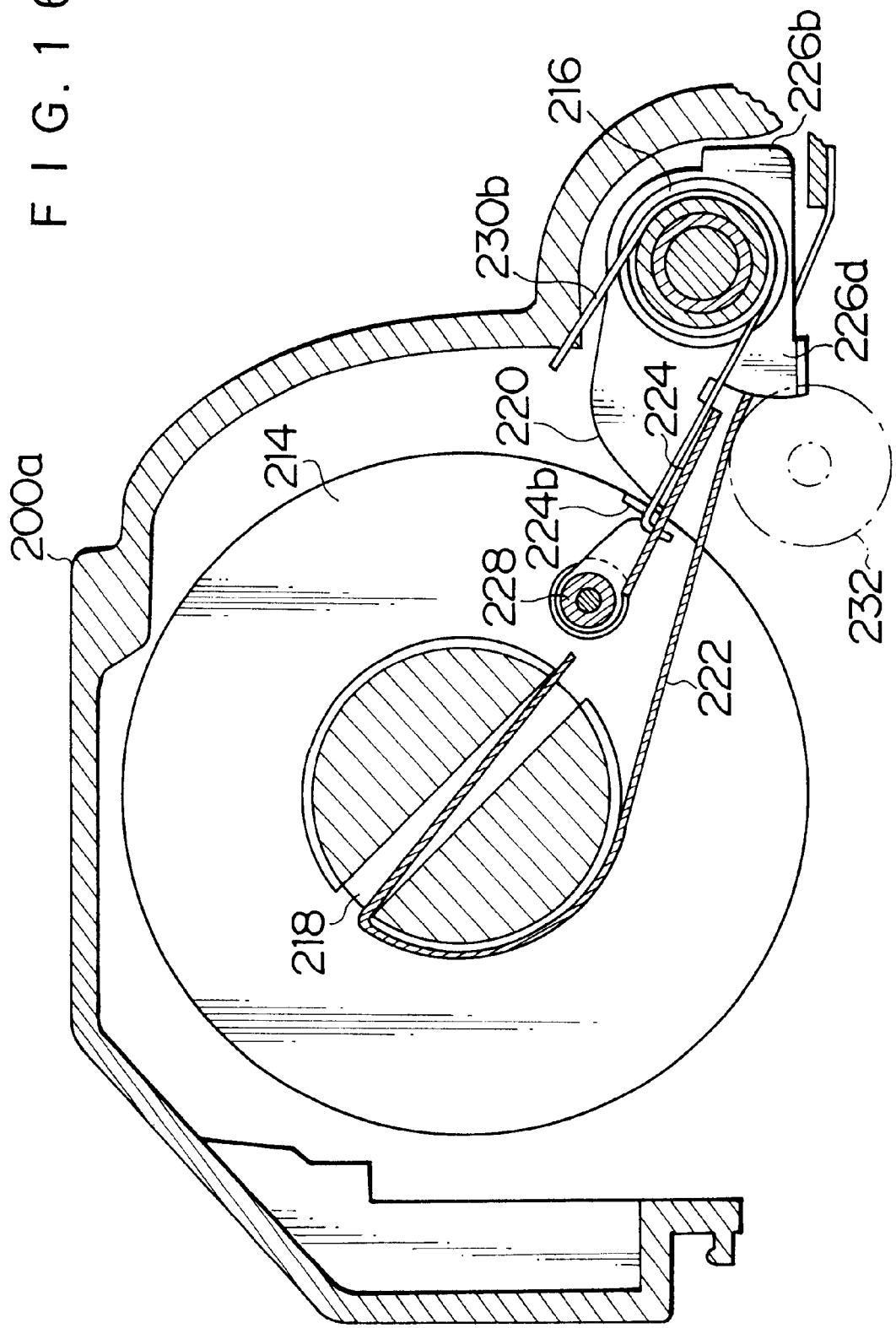
FIG. 16 is a sectional view describing the film winding device in FIG. 13 (when film is loaded)
Figure 17:
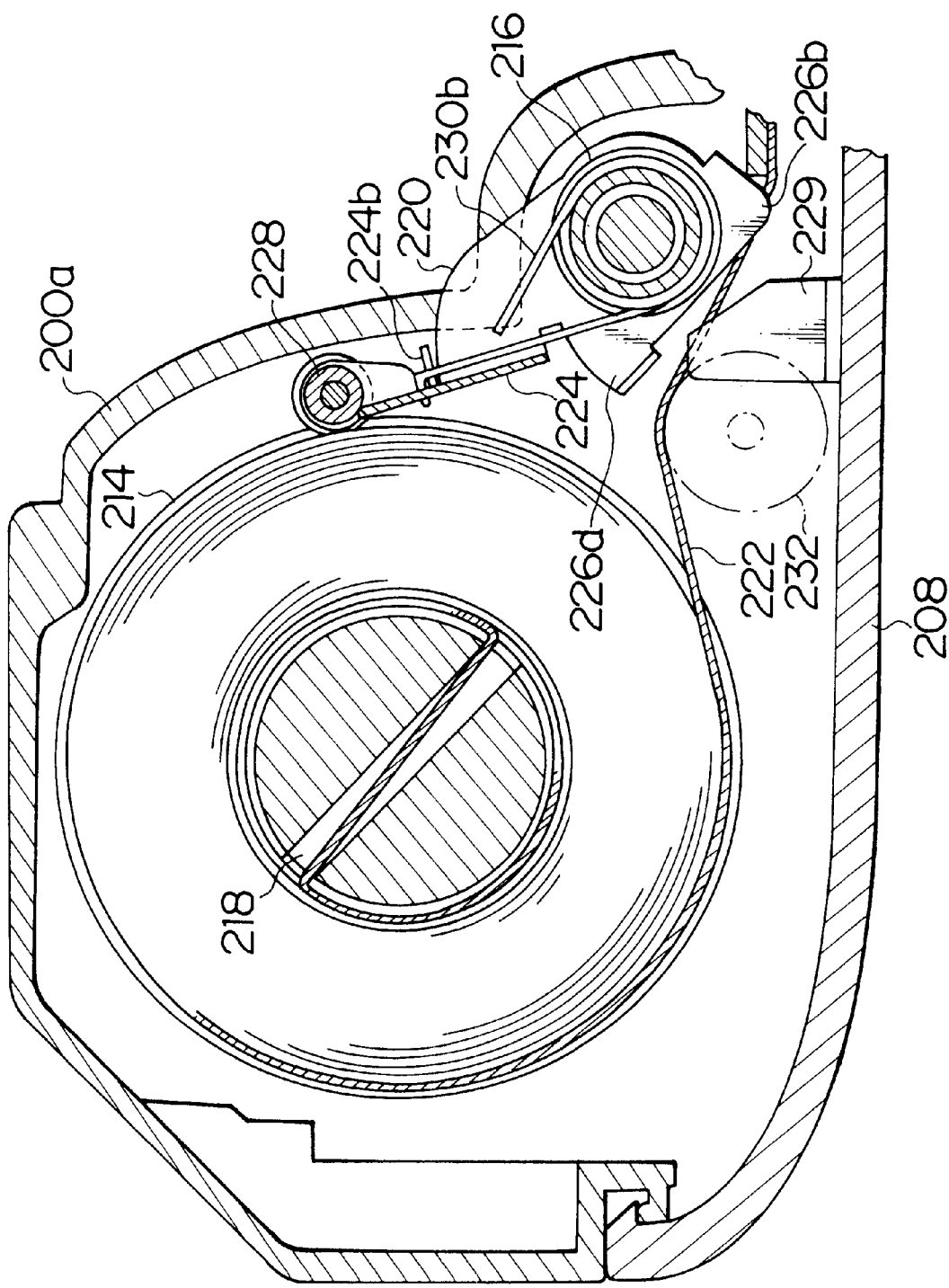
FIG. 17 is a sectional view describing the film winding device in FIG. 13 (when the film winding is complete)

An explanation will hereunder be given about the structure of the movable guide member 220 with reference to FIG. 15, and the retreating action of the movable guide member 220 with reference FIGS. 15, 16 and 17.

FIG. 15 is a sectional view illustrating the state of the movable guide member 220 as well as the counter roller 216 and the film wind spool 214 when the rear cover 208 of the camera is closed. The bending pieces 226a and 226b of the movable guide member 220 are shaped like a thin board on a plane perpendicular to the face of the guide plate 224, and they are axially supported by the rotational axis of the counter roller 216 at both ends thereof.

A substantially trapezoidal flat projection 229 projects from the inner wall of the rear cover 208 of the camera. The point of the projection 229 contacts and pushes flanges 226c and 226d of the bending pieces 226a and 226b, when the rear cover 208 is closed. Thereby, the movable guide member 220 rotates around the rotational axis of the counter roller 216 so that the movable guide member 220 can retreat.

Helical springs 230a and 230b are provided between both ends of the counter roller 216 and both bending pieces 226a and 226b of the counter roller 216. One end of the helical springs 230a and 230b is anchored at the bending points of legs 224a and 224b of the guide plate 224. The helical springs 230a and 230b applies the force to the guide plate 224 of the movable guide member 220 which has retreated to the retreating position.

The long and thin film abutting roller 228 is arranged at the edge of the guide plate 224 so that it can rotate about its axis. After the movable guide member 220 retreats to the middle retreating position (a position indicated by solid lines in FIG. 15), the film abutting roller 228 is pushed out to the outside of the roll film by the outer periphery of the roll film as the film wound around the film wind spool 214 increases. The movable guide member 220 retreats further toward the film chamber wall 200a. In this case, even if the outer periphery of the roll film pushes the film abutting roller 228, the film abutting roller 228 rolls on the outer periphery so as to prevent the surface of the roll film from getting damaged.

In FIG. 15, the leader of the film 222 is inserted into the film leader insertion hole 218 of the film wind spool 214, and the film 222 is wound around the film wind spool 214. A guide roller 232 applies the tension to the film 222.

The broken lines in FIG. 15 indicate both ends of an area wherein the movable guide member 220 can move, and an angle α of rotation of the movable guide member 220 in this area is 45° for example.

When the film 222 is loaded while the rear cover 208 is opened, the movable guide member 220 is set as shown in FIG. 16. The leader of the film 222 which is pulled from the film supplying spool passes the counter roller 216, and goes between the guide plate 224 of the movable guide member 220 and the guide roller 232. Then, the leader of the film 222 is guided by the guide plate 224, and is inserted into the film leader insertion hole 218 of the film wind spool 214, which is located opposite to the edge of the guide plate 224. In FIG. 16, the film wind spool 214 has rotated by approximately 180° from a position when the leader of the film 222 is inserted. The film 222 is wound about halfway around the film wind spool 214 according to the rotation of the film wind spool 214.

A stopper (not shown) for supporting the movable guide member 220 is provided so as to prevent the guide plate 224 from moving closer to the back of the camera than in the state in FIG. 16 due to the force from the helical springs 230a and 230b.

The film wind spool 214 is rotated, and the film 222 is wound around the spool 214. When the film loading is completed, the rear cover 208 is closed.

When the rear cover 208 is closed, the flanges 226c and 226d of the bending pieces 226a and 226b are pushed inward by the projection 229 which projects from the inner wall of the rear cover 208 as stated previously. The movable guide member 220 rotates around the rotational axis of the counter roller 216, and retreats to the position indicated by solid lines in FIG. 15 (the middle retreating position). Then, the film 222 can be wound around the film wind spool 214 every time the exposure of each frame is complete.

After that, if the diameter of the roll film 222 wound around the film wind spool 214 increases, the outer periphery of the roll film abuts on the film abutting roller 228 which is axially supported on the edge of the guide plate 224. The outer periphery of the roll film gradually pushes the film abutting roller 228 toward the outer periphery of the film wind spool 214. When the last frame on the film 222 is exposed, the movable guide member 220 retreats to the position as shown in FIG. 17.

When the film wind spool 214 winds up the whole film from the film supplying spool, the photographing is finished.

Then, the user opens the rear cover 208, and picks up the winding spool 214 and sets the empty film supplying spool as a new film wind spool. Thus, the preparations for loading a new film are completed.

Figure 18:
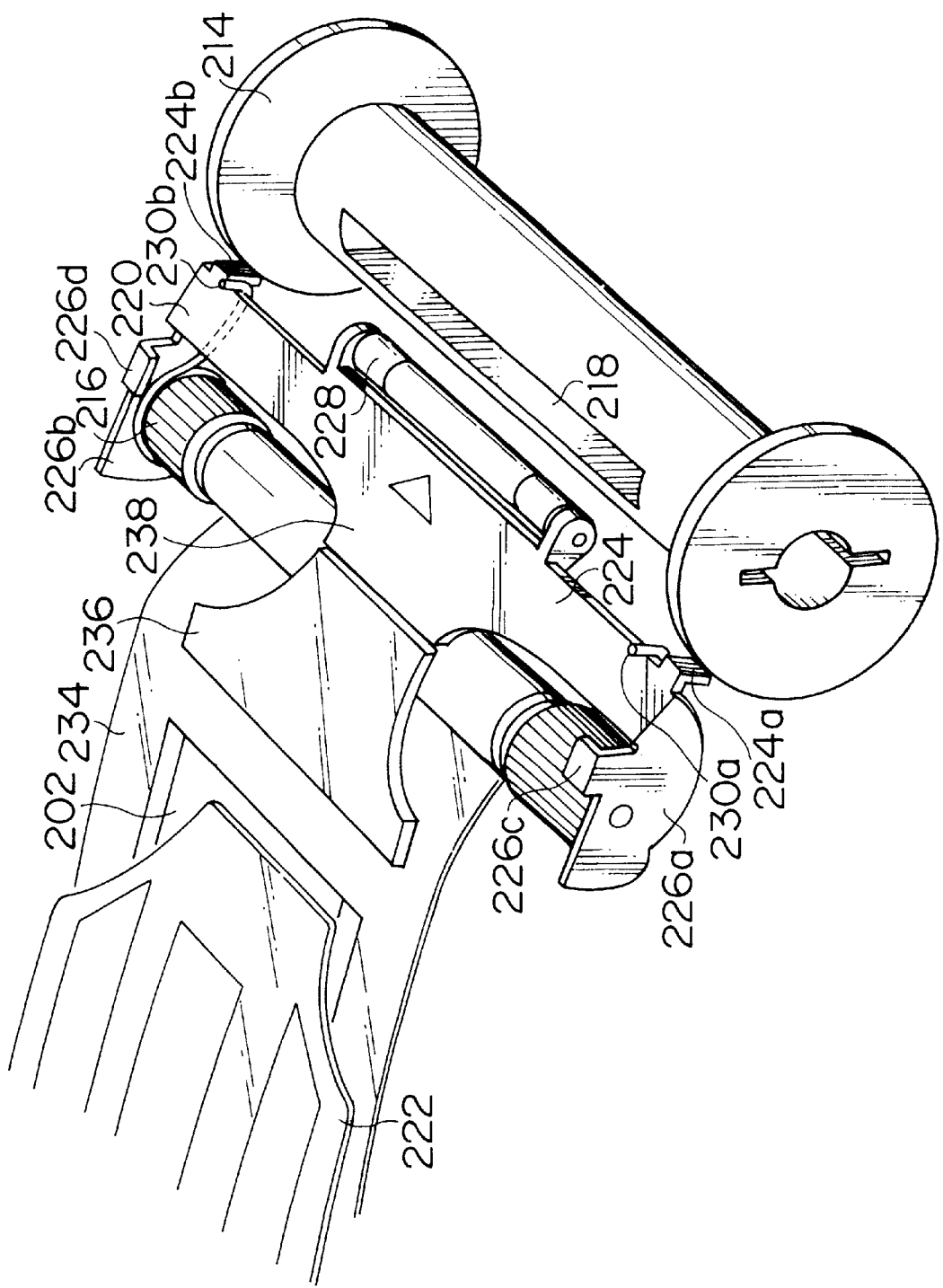
FIG. 18 is a perspective view of a film winding device according to the second embodiment of the present invention.

FIG. 18 is a perspective view illustrating a film winding device according to the second embodiment of the present invention. In FIG. 18, parts similar to those previously described with reference to FIG. 13 are denoted by the same reference numerals, and they will not be described in detail.

In this embodiment, a fixed guide member 236 is provided at a portion 234 adjacent to the aperture 202. The fixed guide member 236 is shaped like a flat plate, and guides the film 222 to the movable guide member 220. The center of the edge of the fixed guide member 236 protrudes forward. The center 238 of the rear end of the guide plate 224 of the movable guide member 220 protrudes backward, and the point of the protruding portion abuts on the point of the protruding portion of the fixed guide member 236.

Thereby, the leader of the film 222 is smoothly guided into the film leader insertion hole 218 of the film wind spool 214.

FIG. 19 is a perspective view illustrating a film winding device according to the third embodiment of the present invention. Parts similar to those previously described with reference to FIG. 13 are denoted by the same reference numerals, and they will not be described in detail.

A counter roller 216 in FIG. 19 is constructed in such a manner that sliding parts 216b are provided at both ends of a shaft 216a, and a center 216c is formed to have a smaller diameter than that of the sliding parts 216b. The film slides on the sliding parts 216b of the counter roller 216. The counter roller 216 is rotated by frictional force between the film and the sliding part 216b.

A mask disc (not shown) is axially supported by the shaft 216a of the counter roller 216, and a plurality of transparent holes are punched along the circumference of the mask circular plate. The number of the counter roller 216's rotations and the exposed frames on the film can be calculated with an LED and a photo-diode, which face each other across the mask circular plate.

A movable guide member 220 comprises a flat guide plate 224, and two bending pieces 226a and 226b which are axially supported by the shaft 216a of the counter roller 216 thereof at both side ends. A long and thin film abutting roller 228 is supported at the front edge of the guide plate 224 in such a manner as to be rotatable about an axis thereof. A projecting part 224c is formed at the rear edge of the guide plate 224, and the projecting part 224c projects to the counter roller 216. The projecting part 224c is close to the shaft 216a at the center 216c of the counter roller 216, and the top of the projection part 224c does not project upward from the outer periphery of the sliding part 216b. When the film is guided into the film leader insertion hole 218, an arrow 250 put on the guide plate 224 indicates the direction of the film.

The guide plate 224 and the counter roller 216 are put together as shown in FIG. 21. First, two sliding parts 216b are inserted into hollow bearing members 216d, and the sliding parts 216b are fixed to the bearing members 216d by screws 216e. Next, the sliding parts 216b fixed to the bearing members 216d are arranged between the projecting part 224c of the guide plate 224 and the two bending pieces 226a and 226b, and the shaft 216a is inserted to be engaged with through holes 226e and 226f formed at the bending pieces 226a and 226b. Thereby, the counter roller 216 is rotatably supported by the guide plate 224.

The leader of the film 222 pulled out from the film supply spool passes the counter roller 216 and the projecting part 224c, and is guided along the guide plate 224. Then the leader of the film 222 is inserted into the film leader insertion hole 218 of the film wind spool 214.

The guide plate 224 of the movable guide member 220 is positioned between the counter roller 216 and the film wind spool 214, so that the leader of the film 222 can be prevented from getting into a gap between the counter roller 216 and the film wind spool 214. Moreover, the projecting part 224c of the guide plate 224 projects up to the counter roller 216, so that the leader of the film 222 can be prevented from getting into a gap between the counter roller 216 and the movable guide member 220. Furthermore, a tape, etc. adhered to the film 222 can be prevented from getting caught in the above-mentioned gaps.

In addition, when the film is guided into the film leader insertion hole 218, the arrow 250 put on the guide plate 224 indicates the direction of the film. The user can recognize at a first glance a direction to pull out the film 222, and the film leader insertion hole 218 into which the leader of the film 222 should be inserted.

FIG. 22 is a perspective view illustrating a film winding device according to the fourth embodiment of the present invention. In FIG. 22, parts similar to those previously described with reference to FIG. 13 are denoted by the same reference numerals, and they will not be described in detail.

In the fourth embodiment, the rear end of the projecting part 224c is curved along the outer surface of the shaft 216a of the counter roller 216. Thereby, the film 222 can be guided more smoothly than in the third embodiment.

An anchoring member 252 for anchoring a helical spring 230a and a temporary anchoring member 254 for temporarily anchoring the helical spring 230a are formed at the outside of the bending piece 226a. The front edge of the guide plate 224 is divided into three parts of a center 224d and two ends 224e and 224f. The film abutting rollers 228a and 228b are supported between the center 224d and the end 224e and between the center 224d and the end 224f in such a manner as to be rotatable about an axis. Thus, the film abutting rollers 228a and 228b are shorter than the film abutting roller 228 of the third embodiment, and the film abutting rollers 228a and 228 can be easily manufactured.

The guide plate 224, the counter roller 216, and the film abutting rollers 228a and 228d are assembled as shown in FIG. 23. First, the sliding parts 216b are arranged between the projecting part 224c of the guide plate 224 and the two bending pieces 226a and 226b. Then, the shaft 216a is inserted to be engaged with the through holes 226e and 226f formed at the bending pieces 226a and 226b, and the sliding parts 236b are fixed to the shaft 216a by the screws 216e. Thereby, the counter roller 216 is rotatably supported by the guide plate 224.

On the other hand, as shown in FIG. 23, U-shaped grooves are formed at the ends 224e and 224f, and the center 224d, and the U-shaped grooves at the ends 224e and 224f are opened upward, and the U-shaped groove at the center 224d is opened downward. The film abutting rollers 228a and 228b are arranged between the center 224d and the ends 224e and 224f, and a shaft 228c is inserted into the U-shaped grooves at the center 224d and the ends 224e and 224f and the film abutting rollers 228a and 228b, so that the film abutting rollers 228a and 228b can be supported by the guide plate 224 in such a manner as to be rotatable about the axis.

Thereby, the leader of the film 222 is smoothly guided into the film leader insertion hole 218 of the film wind spool 214.

The U-shaped grooves are formed at the center 224d and the two ends 224e and 224f so that the shaft 228c of the film abutting rollers 228a and 228b can be supported in such a manner as to be rotatable about the axis. For this reason, the guide plate 224 can be manufactured more easily than the guide plate provided with the through holes in the third embodiment. Since, the film abutting rollers 228a and 228b are shorter than the film abutting roller of the third embodiment, the strength of the film abutting rollers can be improved, and they can be easily manufactured.

Furthermore, the temporary anchoring member 254 is formed at the bending piece 226a in order to temporarily anchor the helical spring 230a. The guide plate 224 is incorporated into the camera after the helical spring 230a is anchored at the anchoring part 252 and the temporary anchoring part 254, and thereafter the helical spring 230a is removed from the temporary anchoring part 254. Thus, the helical spring 230a never comes off when the guide plate 224 is incorporated into the camera. Thus, the guide plate 224 can be easily attached to the camera.

The film winding device of the present invention is not restricted to the above-stated embodiments.

In the above-stated embodiment, the movable guide member 220 starts retreating when the rear cover 208 is closed. The movable guide member 220, however, only has to move to the retreating position before the winding diameter of the roll film 222 wound around the film wind spool 214 reaches a predetermined value. The retreating action of the movable guide member 220 can be connected to a variety of actions in the camera. For example, the movable guide member 220 may retreat in connection with the winding of the film.

Moreover, in the above-stated embodiment, the flanges 226c and 226d are pushed by the bending pieces 226a and 226b of the movable guide member 20 and they are pushed by the projection 229 of the rear cover 208; however, a flange 226c and 226d may be provided at either one of the bending pieces 226a and 226b. In addition, either one of the helical springs 230a and 230b may be provided.

Furthermore, the movable guide member 220 may retreat to the position indicated in FIG. 17 only by the closing action of the rear cover 208.

As stated above, in the camera with the image plane switching function according to the present invention, the exposure frame switching member can be switched to the horizontal photographing exposure frame or the vertical photographing exposure frame by operating the control element. Thereby, the horizontal photographing and vertical photographing can be switched to each other without affecting the photographing, while the camera with the image plane switching function is fixed.

Moreover, in the present invention, the finder visual fields can be switched in connection with the switching of the exposure frames. Thus, even if the horizontal photographing and the vertical photographing are switched to each other while the camera with the image plane switching function is fixed, the user can easily recognize the photographic range.

On the other hand, in the film winding device according to the present invention, the guide member for guiding the film is provided between the counter roller and the film wind spool. Thus, if the device of the present invention is applied to the Brownie camera which requires a skill for loading the film, the leader of the film can be prevented from getting into the gap between the counter roller and the film wind spool when the film is loaded. The leader of the film can be smoothly inserted into the film leader insertion hole of the film wind spool. Thereby, a person who is not accustomed to using the Brownie film can easily load the Brownie film.

Furthermore, according to the film winding device of the present invention, the guide member for guiding the film is provided between the counter roller and the film wind spool, and the guide member is provided with the projecting part which projects to the center of the counter roller. Thus, if the device of the present invention is applied to the Brownie camera which requires a skill for loading the film, the leader of the film can be prevented from getting into the gap between the counter roller and the film wind spool when the film is loaded. The leader of the film can be smoothly inserted into the film leader insertion hole of the film wind spool. Thereby, a person who is not accustomed to using the Brownie film can easily load the Brownie film.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A camera comprising:
an exposure frame switching member between a film supply part and a film winding part, said exposure frame switching member for defining a rectangular film exposure that is selectively changeable between a portrait orientation that has a height of a first length and a width of a second length that is shorter than the first length and a landscape orientation that has a height of the second length and a width of the first length;
an external switch connected to said exposure frame switching member for selectively causing said exposure frame switching member to change the rectangular film exposure between the portrait orientation and the landscape orientation while an orientation of the camera is unchanged;

finder visual field switching means connected to said external switch for switching an opening in a finder visual field between the portrait orientation and the landscape orientation when the rectangular film exposure of said exposure frame switching member is switched between the portrait orientation and the landscape orientation by operation of said external switch; and film feeding means comprising said film supply part and said film winding part for feeding a portion of film whose fed length is a function of the rectangular film exposure of said exposure frame switching member selected by operation of said external switch, wherein said exposure frame switching member and said opening of said finder visual field are switched between the portrait orientation and the landscape orientation by operation of said external switch.

2. The camera of claim 1, wherein the first length is 6 cm and the second length is 4.5 cm.

3. The camera of claim 1, wherein said exposure frame switching member comprises an exposure frame with a first image opening therein;

two L-shaped switching frames with their respective legs overlapping to form a second image opening that is in registration with said first image opening, said L-shaped frames being movable in relation to each other to vary dimensions of said second image opening between said portrait orientation and said landscape orientation, each of said L-shaped frames being movably connected to said exposure frame;

a rotatable driving wheel with a third image opening at least as large as and in registration with said first and second image openings, said driving wheel being movably connected to said two L-shaped frames; and said external switch being movably connected to said driving wheel.

4. The camera of claim 3, wherein said exposure frame has first positioning pins at opposing sides thereof.

5. The camera of claim 3, wherein each of said L-shaped frames has a second positioning pin extended from an apex thereof and a slot in each end of said respective legs thereof.

6. The camera of claim 5, wherein said exposure frame has first positioning pins at opposing sides thereof that are received in respective ones of said slots.

7. The camera of claim 3, wherein said driving wheel has apertures at radially opposite sides thereof and a selection pin.

8. The camera of claim 7, wherein each of said L-shaped frames has a second positioning pin extended from an apex thereof that are received by respective ones of said apertures.

9. The camera of claim 7, wherein said switching lever has a gap therein for receiving said selection pin.

10. The camera of claim 3, wherein the camera uses Brownie film, and the camera comprises a strobe for speed light photography that is one of built in the camera and fixed to the camera.

11. The camera of claim 10, wherein said strobe is built in a central, upper part of the camera and is structured and arranged to project therefrom.

12. The camera of claim 3, wherein said first image opening is rectangular with fixed dimensions.

13. The camera of claim 3, wherein said third image opening is circular with fixed dimensions.

14. The camera of claim 3, wherein said two L-shaped frames are identical.

15. The camera of claim 14, wherein said L-shaped frames each have one leg longer than the other leg.

16. The camera of claim 3, wherein said apertures are radially extended from a center of said third image opening.

* * * * *